(12) United States Patent
Dix et al.

(10) Patent No.: US 9,750,173 B2
(45) Date of Patent: Sep. 5, 2017

(54) DEVICE AND METHOD FOR GUIDING AGRICULTURAL VEHICLES USING MODIFIED SWATH WIDTH

(71) Applicant: CNH Industrial America LLC, New Holland, PA (US)

(72) Inventors: Peter J. Dix, Naperville, IL (US); Brian R. Ray, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 23 days.

(21) Appl. No.: 14/924,238

(22) Filed: Oct. 27, 2015

(65) Prior Publication Data
US 2017/0112045 A1    Apr. 27, 2017

(51) Int. Cl.
  *A01B 69/04*    (2006.01)
  *A01B 79/00*    (2006.01)
  (Continued)

(52) U.S. Cl.
  CPC .......... *A01B 69/008* (2013.01); *A01B 79/005* (2013.01); *G01C 21/005* (2013.01);
  (Continued)

(58) Field of Classification Search
  CPC .. G05D 1/0274; G05D 1/0219; G01C 21/005; G01C 21/30; A01B 69/008; A01B 79/005
  See application file for complete search history.

(56) References Cited

U.S. PATENT DOCUMENTS 5,995,902 A    11/1999  Monson
6,643,576 B1 *  11/2003  O Connor ............. E02F 9/2045
                                                   701/50
(Continued)

FOREIGN PATENT DOCUMENTS

WO    2005/119386 A1    12/2005

OTHER PUBLICATIONS

Jorge A. Heraud and Arthur F. Lange, "Agricultural Automatic Vehicle Guidance from Horses to GPS: How We Got Here, and Where We Are Going", American Society of Agricultural and Biological Engineers, Feb. 9, 2009 (70 pages).
(Continued)

*Primary Examiner* — Dale W Hilgendorf
(74) *Attorney, Agent, or Firm* — Rickard K. DeMille; Rebecca L. Henkel

(57) ABSTRACT

A method for altering a swath path of a vehicle includes the steps of: loading a base swath path and an original swath width into a memory of the vehicle; generating a plurality of swath paths from the base swath path and the original swath width, each of the generated swath paths defining at least two geographic locations; measuring a current geographic location of the vehicle; determining a difference between the current geographic location and a geographic location of a swath path nearest to the current geographic location; determining a number of swath paths that the generated swath path nearest to the current geographic location is subsequent to the base swath path; dividing the difference by the determined number of swath paths to produce a swath width remark distance; and adding the swath width remark distance to the original swath width to produce a modified swath width.

19 Claims, 6 Drawing Sheets

(51) Int. Cl.
*G01C 21/00* (2006.01)
*G05D 1/02* (2006.01)
*G01C 21/30* (2006.01)

(52) U.S. Cl.
CPC ......... *G05D 1/0219* (2013.01); *G05D 1/0274* (2013.01); *G01C 21/30* (2013.01)

(56) References Cited

U.S. PATENT DOCUMENTS

| | | | |
|---|---|---|---|
| 6,711,501 B2 | 3/2004 | McClure et al. | |
| 7,451,030 B2 | 11/2008 | Eglington et al. | |
| 7,689,354 B2 * | 3/2010 | Heiniger | A01B 69/008 701/50 |
| 7,689,356 B2 * | 3/2010 | Dix | A01B 69/008 701/50 |
| 7,706,948 B2 * | 4/2010 | Dix | A01B 69/008 701/50 |
| 7,715,979 B2 * | 5/2010 | Dix | A01B 69/008 701/50 |
| 8,060,269 B2 * | 11/2011 | Dix | A01B 69/008 701/50 |
| 8,145,390 B2 | 3/2012 | Dix et al. | |
| 8,214,111 B2 * | 7/2012 | Heiniger | A01B 69/008 701/50 |
| 8,296,052 B2 | 10/2012 | Dix et al. | |
| 8,386,129 B2 | 2/2013 | Collins et al. | |
| 8,494,726 B2 | 7/2013 | Peake et al. | |
| 8,571,744 B2 | 10/2013 | Brubaker et al. | |
| 8,583,326 B2 | 11/2013 | Collins et al. | |
| 2006/0195238 A1 | 8/2006 | Gibson et al. | |
| 2013/0191017 A1 | 7/2013 | Peake et al. | |
| 2014/0081568 A1 | 3/2014 | Pieper et al. | |
| 2014/0163806 A1 | 6/2014 | Aznavorian et al. | |

OTHER PUBLICATIONS

Robert "Bobby" Grisso, et al., "Precision Farming Tools: GPS Navigation", Virginia Cooperative Extension Publication 442-501, 2009 (7 pages).

* cited by examiner

Fig. 4

DEVICE AND METHOD FOR GUIDING AGRICULTURAL VEHICLES USING MODIFIED SWATH WIDTH

BACKGROUND OF THE INVENTION

1. Field of the Invention

The present invention relates to agricultural vehicles, and, more particularly, to guidance assisted agricultural vehicles.

2. Description of the Related Art

Agricultural vehicles and implements are commonly used to perform various agricultural functions, such as tilling, planting, spraying, and fertilizing. As modern farming methods have increased the yield of crops, many farming operations have seen increased costs associated with more advanced farming methods. Precise control of farming operations can increase the efficiency of the operations and reduce costs to the farmer. To this end, automation of farming operations can help increase the productivity and efficiency to lower the costs for farmers. One such example of farming operation automation is automatic guidance of various farm vehicles performing the farming operations.

Agricultural vehicles commonly utilize control systems connected to position sensing technology, such as global positioning systems (GPS), to provide automatic guidance control in performing these various agricultural functions. The automatic guidance control systems are capable of steering the vehicle with a high degree of accuracy. The automatic guidance control systems often operate by creating at least one original base guidance line, called an "AB line," and then generating an array of adjacent guidance lines to be followed by the agricultural vehicle in performing its function. These adjacent guidance lines, or swaths, depend not only on the geometry of the original AB guidance line, but also upon the physical characteristics and limitations of the agricultural vehicle and/or any towed agricultural implements. Such physical characteristics and limitations may include width, location of the implement with respect to the vehicle, and limitations of movement, such as minimum turning radius.

Farmers often own multiple agricultural vehicles or implements built by different manufacturers. Further, some farmers may wish to have another party with a different agricultural vehicle perform various operations using the farmer's supplied guidance lines. The guidance lines that are created by the automatic guidance control systems of these different agricultural vehicles do so using different algorithms. As a result, the guidance lines often differ, especially as the adjacent guidance lines get further and further from the original AB guidance line. If the previous guidance lines were created by the automatic guidance control system algorithm of another manufacturer, the guidance lines created by the automatic guidance control system algorithm of an agricultural vehicle being utilized currently may not match. Without some way to account for this mismatch, the automatic guidance control system cannot accurately follow the desired guidance lines because the mismatch is a compounding error that will continue to increase as the vehicle travels further from the original guidance line.

One particular reason for the mismatch that occurs is due to the need for converting latitude and longitude coordinates that are obtained by, for example, a GPS system to a Cartesian coordinate system so that metrics such as distance can be calculated. Since latitude and longitude coordinates are measured in radians, corresponding to the curvature of the Earth, and Cartesian coordinates are assumed to lie on a flat two-dimensional plane, the latitude and longitude coordinates can be converted using the previously mentioned algorithm to account for the curvature of the Earth to produce the corresponding Cartesian x-y coordinates. To convert the latitude and longitude coordinates to Cartesian coordinates, different algorithms may rely on different assumptions such as the Earth being spherical or ellipsoidal, different values for the equatorial radius of eccentricity, compensation for altitude, etc. These differences can cause the generated guidance lines to considerably vary, depending on what assumptions are used to generate the guidance lines. Since the generated guidance lines are estimates based on the given latitude and longitude coordinates, there can also be rounding errors present in the generated guidance lines. One such rounding error can be in calculating the swath width, which can be the source of the mismatch that propagates through the system's calculations. Without some way to correct the miscalculated swath width, the mismatch can compound as previously described.

What is needed in the art is a way to compensate for different swath generating algorithms being used to more accurately and reliably control an automatically guided agricultural vehicle.

SUMMARY OF THE INVENTION

The present invention provides a method to compensate for different swath generating algorithms that includes determining a difference between a current geographic location of a vehicle and a geographic location of a swath path nearest to the vehicle, dividing the difference to produce a swath width remark distance, and adding the swath width remark distance to an original swath width.

The invention in one form is directed to a method for altering a swath path of a vehicle including the steps of: loading a base swath path and an original swath width into a memory of the vehicle; generating a plurality of swath paths from the base swath path and the original swath width, each of the generated swath paths defining at least two geographic locations; measuring a current geographic location of the vehicle; determining a difference between the current geographic location and a geographic location of a swath path nearest to the current geographic location; determining a number of swath paths that the generated swath path nearest to the current geographic location is subsequent to the base swath path; dividing the difference by the determined number of swath paths to produce a swath width remark distance; and adding the swath width remark distance to the original swath width to produce a modified swath width.

The invention in another form is directed to an agricultural vehicle including: a chassis; at least one farm implement carried by the chassis; a memory carried by the chassis having a base swath path and an original swath width programmed therein; a location sensor carried by the chassis that is operable to measure a current geographic location; and an electronic processing circuit (EPC) carried by the chassis and coupled to the memory and the location sensor. The EPC is operable to generate a plurality of swath paths from the base swath path and the original swath width, each of the generated swath paths defining at least two geographic locations; determine a difference between the current geographic location and a geographic location of a generated swath path nearest to the current geographic location; determine a number of swath paths that the generated swath path nearest to the current geographic location is subsequent to the base swath path; divide the difference by the determined number of swath paths to produce a swath width remark distance; and add the swath width remark distance to the original swath width to produce a modified swath width.

The invention in yet another form is directed to a method for altering a swath pattern of a vehicle including the steps of loading a base swath path and an original swath width into a memory of the vehicle; generating a plurality of swath paths from the base swath path and the original swath width, each of the generated swath paths defining at least two geographic locations; inputting a swath width remark distance into the memory; adding the swath width remark distance to the original swath width to produce a modified swath width; and re-generating at least one of the generated swath paths using the modified swath width in place of the original swath width.

An advantage of the present invention is the adjustment of the swath width is relatively easy since it can be done by simply positioning the vehicle.

Another advantage is the adjusted swath width can be stored to correct future uses of a differing manufacturer swath generating algorithm.

Yet another advantage is the swath correction can be done independently of the implement being carried by the vehicle.

Yet another advantage is the swath width remark distance can be input and/or modified without needing to re-position the vehicle.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 4 is a screenshot view of an embodiment of a graphical user interface shown on a vehicle display according to the present invention;

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
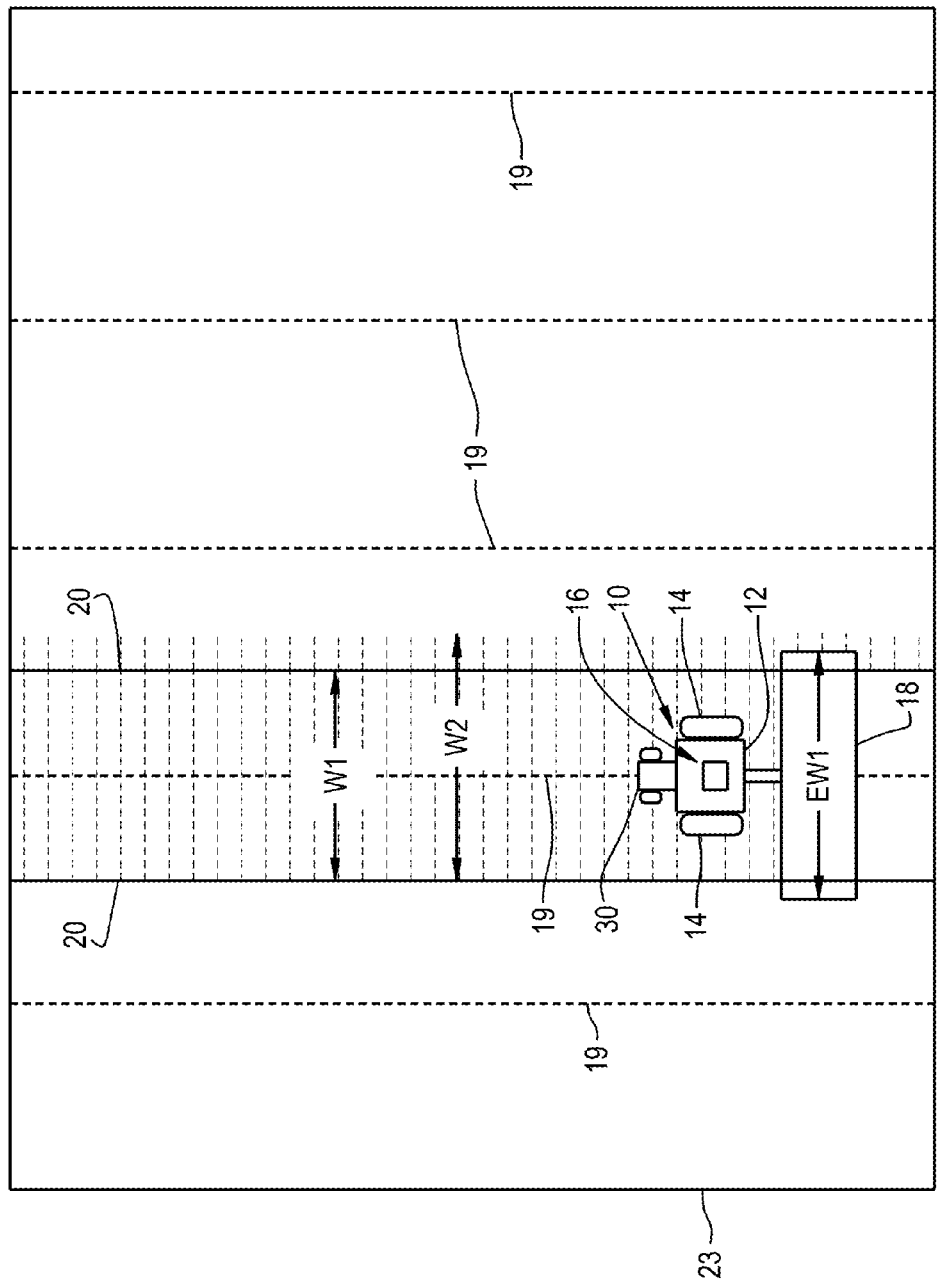
FIG. 1 is a plan view of an embodiment of a vehicle according to the present invention going across a field along pre-generated swath lines that do not have a correct swath width, causing the swath lines to be inaccurate.
Figure 2:
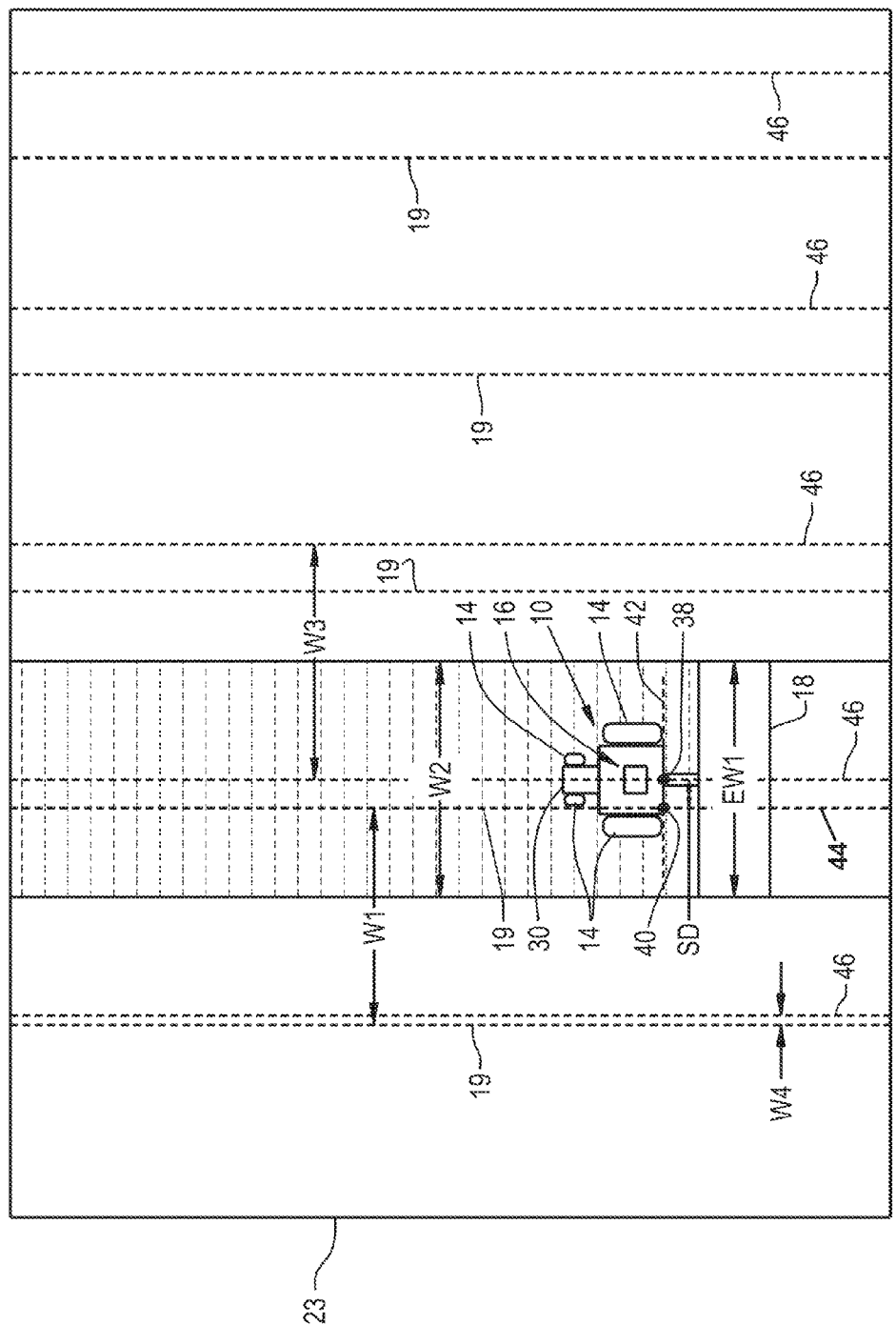
FIG. 2 is a plan view of the vehicle shown in FIG. 1 after generating modified swath widths to produce accurate swath lines.
Figure 3:
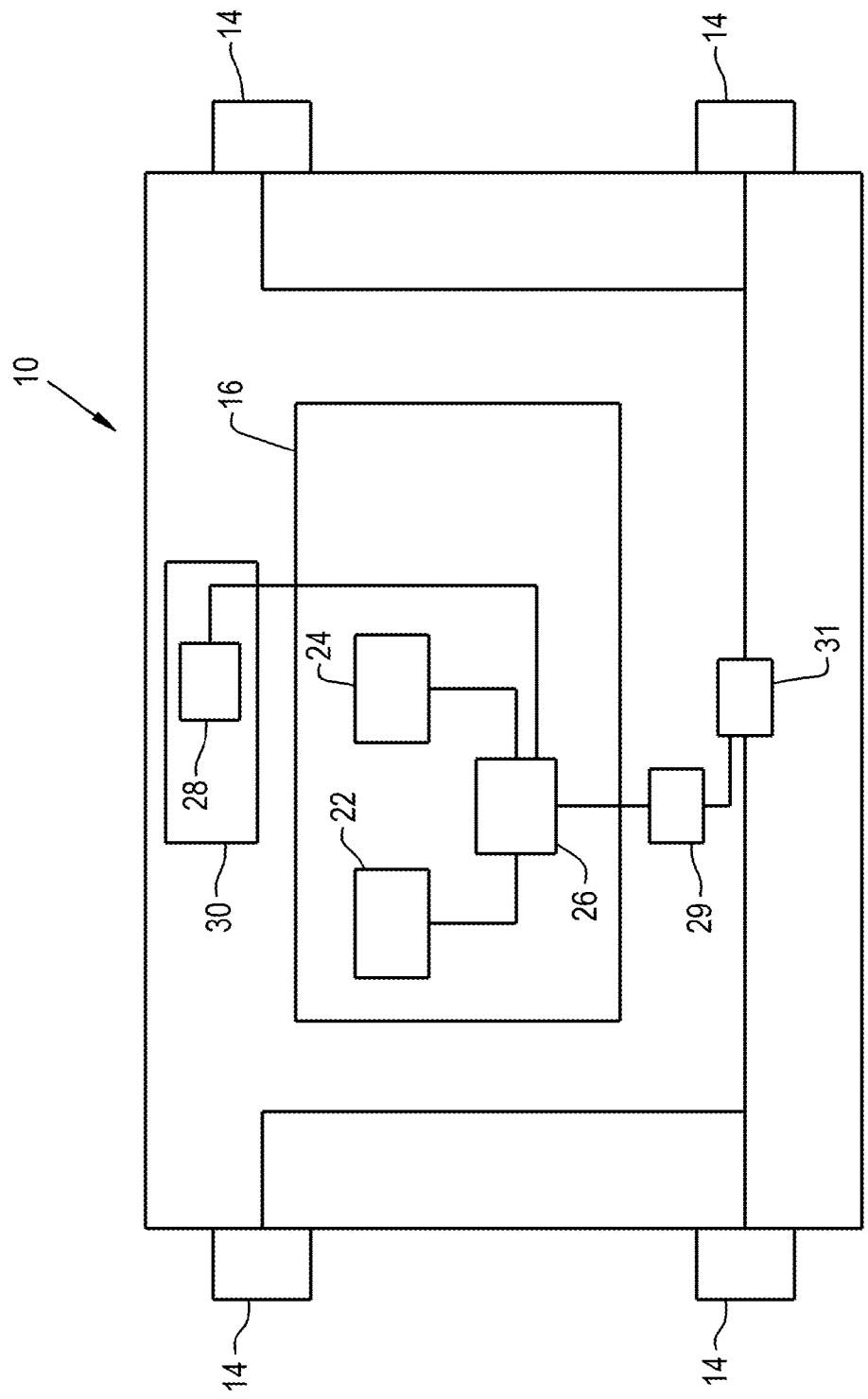
FIG. 3 is a block diagram of an embodiment of a vehicle according to the present invention.

Referring now to the drawings, and more particularly to FIG. 1, there is shown a vehicle 10, shown as a tractor, which generally includes a chassis 12, wheels 14 carried by the chassis 12 and linked to an engine (not shown) that drives the wheels 14, and a guidance system 16, which is illustrated in more detail in FIG. 3, that is carried by the chassis 12. As can be seen, the tractor 10 is travelling through a field and pulling an agricultural implement 18 behind the tractor 10 along a swath path 19 generated by the guidance system 16 and displayed to a user inside the tractor 10 and/or automatically followed by the guidance system 16 to drive the tractor 10 along the swath path 19. The swath path 19 can be a part of a swath pattern, which defines multiple swath paths 19 for the tractor 10 to follow and cover a desired area of the field with the implement 18, and is generated from a base swath path 23. Typically, the swath paths 19 are generated so that the swath paths 19 are parallel to the base swath path 23 and distanced from the base swath path 23 a distance W1, which is referred to as a swath width. The swath paths 19 can be generated by the guidance system 16 as needed from the base swath path 23 and swath width W1 to reduce the computational and memory requirements of the guidance system 16. On one or both sides of the swath path 19, a half-width line 20 is defined. The swath path 19 can be generated as a variety of shapes, depending on the shape of the field, such as A/B lines between two points on a Cartesian plane, and the original swath width W1 separates two half-width lines 20 so that the half-width lines 20 are equally spaced from the swath path 19 and together define the swath width W1, as shown. The swath width W1 can be chosen to match an approximate effective width EW1 of the implement 18 or be greater or less than the effective width EW1 to allow for gaps or overlap, respectively, of the implement 18 being carried across the field. A more detailed description of general swath line and swath path generation principles is found in U.S. Pat. No. 7,715,979, which is incorporated herein by reference for brevity in describing the features of the present invention. It should be appreciated that while the swath paths illustrated in FIGS. 1-2 are straight lines, the present invention can be readily applied to correct the mismatch that occurs in curved or other shapes of generated swath paths.

As shown in FIG. 1, the tractor 10 is pulling the implement 18 across a field with crops planted in rows, with the rows indicated by shading. It should be appreciated that while the tractor 10 is shown as pulling the implement 18 across a field with row crops, the present invention can also be incorporated in farming operations involving crops that are not in rows. The user may want the implement 18 to be pulled across the rows so that the effective width EW1 of the implement 18 is pulled across a row width W2 of each row with no overlap or missed areas between passes. The swath width W1, therefore, would align with the row width W2 so that the implement 18 effectively covers the entire row width W2 of each row as it is pulled by the tractor 10. As can be seen, the row width W2 of the rows does not align with the region between the half-width lines 20 corresponding to the swath width W1. Rather, the row width W2 is slightly wider than the swath width W1, which can cause overlap or gaps to be formed in the field during autoguidance. This can be due to a variety of factors, such as the generated swath paths 19 being generated using a different latitude/longitude to Cartesian conversion algorithm than the guidance system 16 carried by the tractor 10. As is known, the swath paths 19 can be saved in the guidance system 16 as a series of swath segments that are connected to one another to form the swath paths 19. The swath segments can be constructed as connected geographic locations, with each geographic location being initially saved as a latitude and longitude coordinate. When the guidance system 16 interprets the previously saved geographic locations to construct the swath paths 19, the resulting swath paths 19 and half-width lines 20 might not match the originally constructed swath paths and lines due to differences in generating the swath paths from the geographic locations and swath segments. To correct this mismatch, the user can utilize a known "Remark" function in the guidance system 16 that allows the user to remark the base swath path that is used to construct subsequent swath paths. This correction can be effective in the immediate term, but may require the user to utilize the "Remark" function several times to accurately cover the rows or may not be effective at a far length away from the remarked swath path. Another potential fix the user might try is to utilize a known "Nudge" function in the guidance system 16 that will push a subsequent swath path generated from the base swath path a specified distance to generate a new parallel swath path. This also does not fix the mismatch present in the system, because the swath width used to calculate subsequent swath paths will still be incorrect and manifest in subsequent swath paths from where the Nudge was performed. Therefore, the "Remark" or "Nudge" functions are not a true fix for the underlying problem of the mismatch between the original swath width W1 and the row width W2, which can also be referred to as the desired swath width, and will therefore fail to prevent further error from manifesting in subsequently generated swath paths and may frustrate some users that recognize the mismatch is the root problem.

Figure 4:
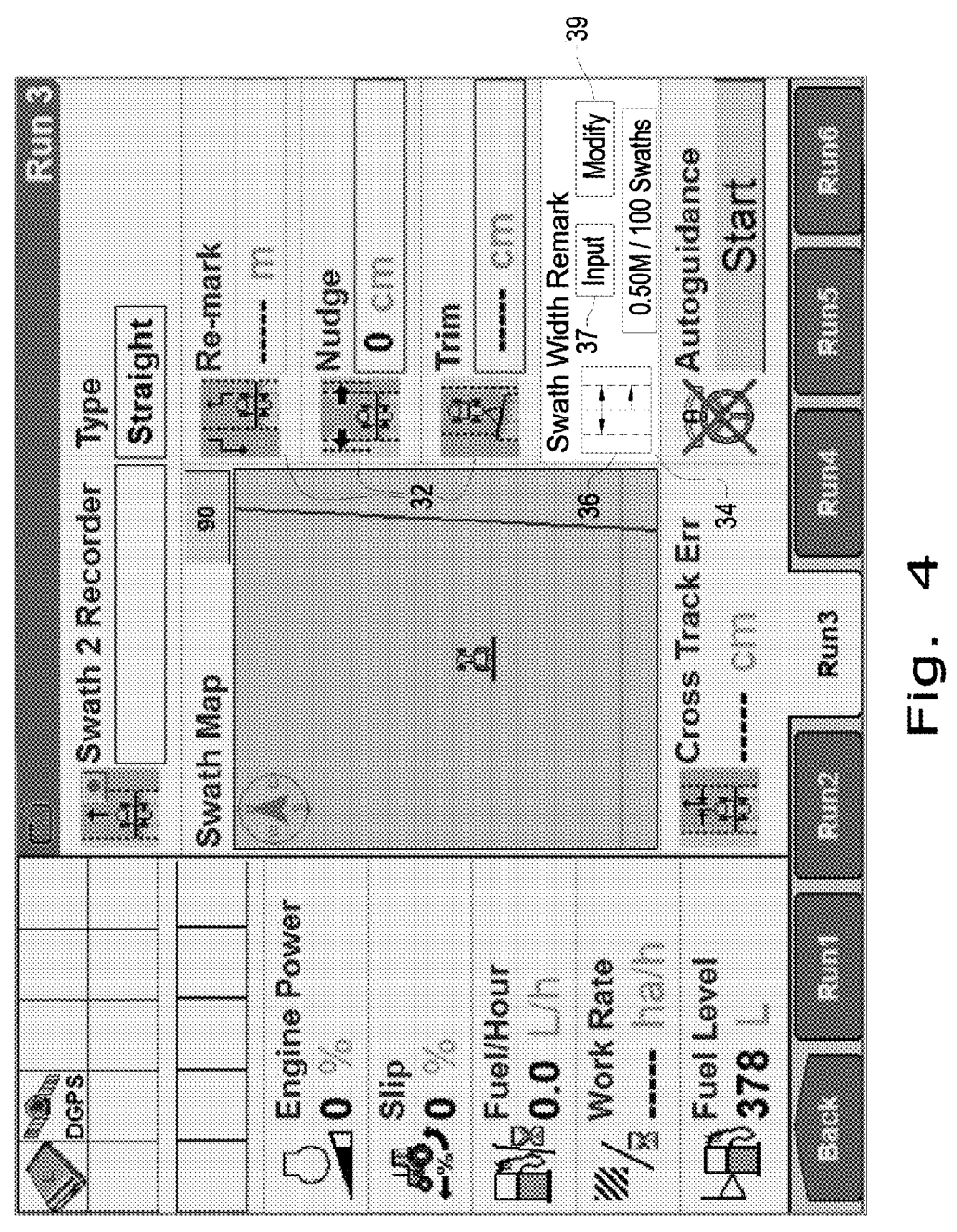
Figure 5:
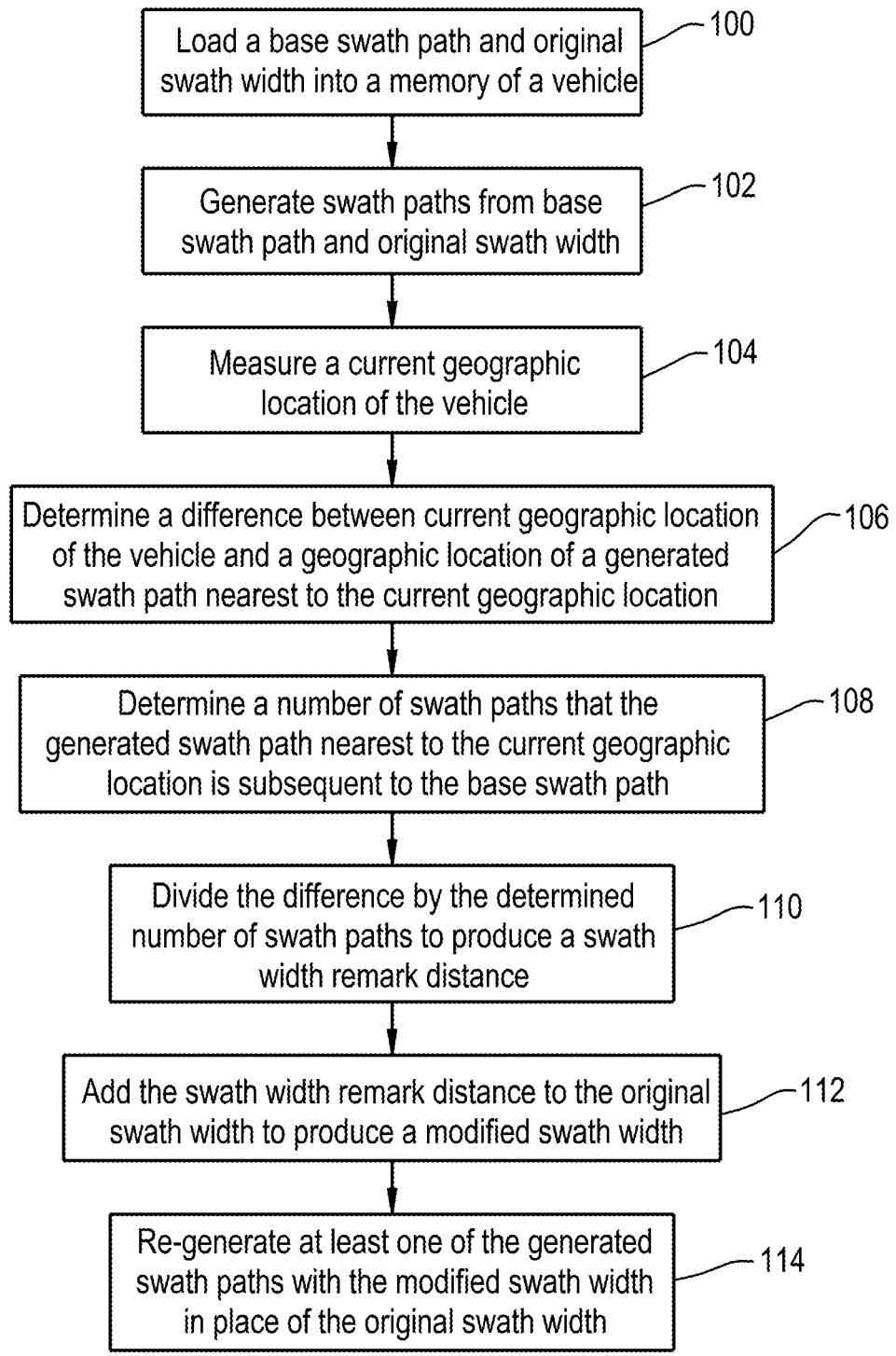
FIG. 5 is a flow chart of an embodiment of a method according to the present invention.

To correct the mismatch between the original swath width W1 and the desired swath width W2, and referring now to FIGS. 3-5, the vehicle 10 is equipped with a guidance system 16 that includes a memory 22 loaded with the base swath path 23 and original swath width W1, a location sensor 24 that measures a current geographic location of the location sensor 24 or another reference point of the vehicle 10, and an electronic processing circuit (EPC) 26 coupled to the memory 22 and the location sensor 24. The memory 22 can be any type of programmable memory that is capable of storing one or more swath paths for use by the guidance system 16 to help properly navigate the vehicle 10 across the field, and may include one memory unit or multiple memory units. The base swath path 23 can be loaded into the memory 22 in a variety of ways. The base swath path 23 can be, for example, recorded by the guidance system 16 and loaded into the memory 22, as is known, or loaded into the memory 22 from an outside source via transfer from a memory card, wireless connection or wired connection. The base swath path 23 therefore does not need to be pre-recorded by a guidance system, but can be created using field management or office software before being loaded into the memory 22. The original swath width W1 can be loaded into memory 22 by any suitable method, such as by the user manually entering the swath width W1 into the memory 22 or by the carried implement 18 communicating with the guidance system 16 to automatically load the swath width W1 into the memory 22, as is known. The memory 22 can either be writeable or write protected to allow or disallow, respectively, the base swath path 23 or pattern from being modified in the memory 22. It may be useful, for example, to write protect the loaded swath path or pattern in the memory 22 as a reference and store any modifications to the swath path or pattern in an independent memory in the event that significant undesirable modifications are made to the swath path or pattern and the user wishes to go back to the originally loaded swath path or pattern without performing a complete reset of the system. The location sensor 24 can be any type of geopositioning sensor that determines the latitude and longitude coordinates of the sensor 24 or another reference point on the vehicle 10, such as a center of the implement 18, and communicates these coordinates to the EPC 26 for processing by the EPC 26. One example of a suitable location sensor 24 is a GPS sensor which communicates with satellites orbiting the Earth to determine the location of the GPS sensor, but other types of location sensors 24 can also be used if desired. It should be appreciated that the location sensor 24 can be a stand-alone module that determines the latitude and longitude coordinates and outputs these coordinates to the EPC 26, or a reliant sensor, such as an antenna, that merely acts as a signal receiver and emitter but does not actually process any received or sent signals.

The EPC 26 of the guidance system 16 is coupled to the memory 22 and location sensor 24 and provides computational power required by the guidance system 16. The EPC 26 can be any type of processing circuit, such as a central processing unit (CPU), an application specific integrated circuit (ASIC), etc. The EPC 26 can be the main controlling circuit for the entire vehicle 10 or can be dedicated solely to the function of a few specific systems, including the guidance system 16, and coupled to a main controlling circuit of the vehicle 10. The EPC 26 can be coupled to a display 28 that is held within a cabin 30 (shown in FIGS. 1-2) of the vehicle 10 to allow the user to control the guidance system 16 during operation of the vehicle 10. To this end, the display 28 can be interactive so that a user can see a graphical user interface (GUI) shown on the display 28, such as the GUI shown in FIG. 4, and interact with the display 28 to control the guidance system 16 via the EPC 26. The display 28 can be directly interactive by the user, i.e., a touchscreen, or the user can have a peripheral device, such as a control stick, that allows the user to interact with the GUI shown on the display 28. The EPC 26 can also be coupled to an automatic steering system 29 that controls a steering mechanism 31 linked to the wheels 14 or a different traction member of the vehicle 10. The steering mechanism 31 controls the direction of the wheels 14 as the tractor 10 moves and can change the direction that the tractor 10 travels by changing the direction that the wheels 14 are facing. The steering mechanism 31 can be controlled manually by a user via a steering wheel or similar construction, but can also be controlled by the automatic steering system 29 that is coupled to the EPC 26. The automatic steering system 29 can receive control signals from the EPC 26 and convert the received signals into movement of the steering mechanism 31 to change the travel direction of the tractor 10. In this sense, the automatic steering system 29 allows the EPC 26 to automatically control the travel direction of the tractor 10 without any user input necessary. Such systems are known in the art and the details of their structure and function are omitted for brevity of description.

Specifically referring now to FIG. 4, an example GUI that can be shown on the display 28 for the user to interact with is shown. As can be seen, the GUI has multiple user defined windows (UDW) 32 that the user can select to view various stored parameters and cause the EPC 26 to perform various functions. As shown in FIG. 4, one of these UDWs 32 can be a swath width remark window 34, which displays a swath width remark menu. In the swath width remark menu, the current swath width remark distance can be shown as a distance over a certain number of swaths, such as 0.50 meters over 100 swaths, to give the user an appreciable sense of the swath width remark distance. If the swath width remark feature, discussed further herein, has not been utilized, the swath width remark distance can be shown as either 0 distance over a certain number of swaths or a designation such as N/A to communicate to the user that the swath width remark feature has not been activated. The swath width remark menu can include a swath width remark activation graphic 36 which, when activated, will cause the EPC 26 to perform various operations to determine a swath width remark distance and modify the original swath width W1, as described further herein. The UDW 32 can also have an input swath width remark distance graphic 37 and a modify swath width remark distance graphic 39, which will be described further herein.

To determine the swath width remark distance previously described and referring now to FIG. 2, the user has repositioned the tractor 10 to correctly line up with the rows, which are once again shown as shading, and activates the swath width remark feature. After the swath width remark feature activates, the EPC 26 causes the location sensor 24 to measure a current geographic location, depicted as point 38 in FIG. 2. The current geographic location 38 can correspond to a variety of relative locations on the vehicle 10 such as the location of the location sensor 24, the location of an arbitrary point on the vehicle 10 that is on a longitudinal center line of the vehicle 10, or a point on the implement 18 that is on a longitudinal center line of the implement 18. The location sensor 24, if configured as a GPS sensor, receives longitude and latitude coordinate signals from a remote satellite and can transmit these signals to the EPC 26 to be converted into Cartesian coordinates or, optionally, convert the longitude and latitude coordinate signals into Cartesian coordinates directly before transmitting a signal to the EPC 26.

Once the current geographic location 38 is measured, the EPC 26 determines a geographic location of a nearest swath path, designated as point 40, from the generated swath pattern. The EPC 26 can determine this geographic location 40 by, for example, comparing the distance between the current location 38 and all locations defined by the swath paths 19 to determine the smallest distance or another method to accurately determine the geographic location 40 that does not require as much computing power. For example, the EPC 26 can construct perpendicular lines, shown as lines 42, to the current geographic location 38 and followed swath path to determine intersection points between the constructed perpendicular lines 42 and adjacent swath paths 19. Once the intersection points are identified, the EPC 26 can calculate the distance between the current geographic location 38 and the intersection points to determine a closest intersection point, which will be point 40 shown in FIG. 2, that has a smallest distance SD. After determining the smallest distance SD, the EPC 26 determines a number of swath paths that the nearest swath path, designated as 44, is subsequent to the base swath path 23. As can be seen in FIG. 2, the nearest swath path 44 is two swath paths subsequent to the base swath path 23, i.e., the nearest swath path 44 is the third swath path in the pattern, with the base swath path 23 being the first. The distance SD, which can also be referred to as a difference between the current geographic location 38 and the geographic location 40 of the nearest swath path 44, is then divided by the determined number, which will be two in the provided example, to produce a swath width remark distance W4. The swath width remark distance W4 is then added to the original swath width W1 to produce a modified swath width W3 that corrects the mismatch. By dividing the distance SD by the number of swath paths that the nearest swath path 44 is subsequent to the base swath path 23, the guidance system 16 can correct a very small mismatch of the original swath width W1 that is only observable after the vehicle 10 goes across a large number of swath paths 19. It should therefore be appreciated that the example shown in FIG. 2 is only illustrative of the principles of how one embodiment of the current invention operates, and that in many scenarios the number of swath paths the nearest swath path is subsequent to the base swath path can be 50 or higher.

After producing the modified swath width W3, the EPC 26 can re-generate the swath paths 19 using the modified swath width W3 and the base swath path 23 to produce a modified swath pattern. Such methods of producing swath paths from a base swath path are known from, for example, U.S. Pat. No. 7,689,356 and do not warrant further elaboration. The modified swath width W3 can allow the modified swath pattern that is produced to correct the mismatch that occurs between different algorithms being used to generate the swath paths 19 of FIG. 1, and produces modified swath paths 46 that can correctly align with the rows. If the user notices later that the rows are still not matching the modified swath width W3 and believes the modified swath width W3 is still incorrect, the user can perform another swath width remark using the swath width remark activation graphic 36 to repeat the previously described swath width remark procedure to find another swath width remark distance and add this other difference to the modified swath width W3 to produce a new modified swath width. If the user repeats the swath width remark procedure, the additional swath width remark distance that is determined by the EPC 26 can be added to the original swath width W1 to replace the modified swath width W3 when re-generating the swath paths from the base swath path 23. Such re-modifying of the swath width can be done as many times as the user wishes.

The EPC 26 can optionally write the modified swath width W3 and/or swath width remark distance W4 into the memory 22 so that the modified swath width W3 and/or swath width remark distance W4 are stored for future use by the guidance system 16. After being stored, the modified swath width W3 and/or swath width remark distance W4 can later be recalled by the EPC 26 of the vehicle 10 to control the automatic steering system 29 or uploaded to an external memory for processing and/or evaluation using office or field management software. If desired, the modified swath width W3 and/or swath width remark distance W4 can be displayed to the user as a distance with units, such as inches or meters, but stored as a percentage of the original swath width W1. For example, the modified swath width W3 can be displayed to the user as an absolute width, such as 3.0 m, but stored as 105% of the original original swath width W1. Likewise, the swath width remark distance W4 can be stored as a percent deviation from the original swath width W1, such as 5%. Storing the modified swath width W3 and/or swath width remark distance W4 as a percentage, rather than an absolute distance, can allow the EPC 26 to recall the modified swath width W3 and/or swath width remark distance W4 to correct future swath patterns that are stored in the memory 22 without needing to utilize the swath width remark feature.

Referring now to FIG. 5, a flow chart of an embodiment of a method according to the present invention is shown. The method starts with loading 100 a base swath path 23 and an original swath width W1 into the memory 22 of the vehicle 10. A plurality of swath paths 19 are generated 102 from the base swath path 23 and original swath width W1 that each define at least two geographic locations and the swath paths 19 are separated from one another by an original swath width W1. When the user activates the swath width remark feature, the location sensor 24 measures 104 the current geographic location 38 of the vehicle 10 and transmits this location to the EPC 26. The EPC 26 can then determine 106 a difference SD between the current geographic location 38 of the vehicle 10 and a geographic location of a swath path 44 nearest to the vehicle, designated as point 40 in FIG. 1, as previously described. Once the difference SD is determined, the EPC 26 determines 108 a number equal to the number of swath paths that the nearest swath path 44 is subsequent to the base swath path 23 and divides 110 the difference SD by this determined number to produce a swath width remark distance W4. The swath width remark distance W4 is then added 112 to the original swath width W1 to produce a modified swath width W3 that can be used by the EPC 26 to re-generate 114 the generated swath paths 19 into modified swath paths 46, as shown in FIG. 2. The swath width remark distance W4 can also be stored in the memory 22 for future use or exporting to a different memory for analysis and/or further modification. If the user notices that the modified swath width W3 still does not seem to match up with the row width W2, the user can initiate the swath width remark feature again to repeat the measuring 104, determining 106, 108 and dividing 110 steps to determine an additional swath width remark distance that is added 112 to the original swath width W1 in place of the swath width remark distance W4 to produce a new modified swath width that can be used to re-generate the swath paths in place of the originally modified swath width W3. The user can also manually modify the swath width remark distance W4 by selecting the modify swath width remark distance graphic 39 in the UDW 32 and inputting a desired modification to make to the swath width remark distance W4. The modification to the swath width remark distance W4 can be entered as an absolute distance, such as 0.0003 m, or a distance over a certain number of swath paths, such as 0.3 m over 100 swath paths. This allows the user to modify the swath width remark distance W4 with a previously determined correction, even if the correction is very small. The modification can then be added to the swath width remark distance W4 if the input modification is a positive value or subtracted from the swath width remark distance W4 if the input modification is a negative value to produce a modified swath width remark distance that is added to the original swath width W1 to produce a new modified swath width. Once the user feels the stored swath width and redefined swath paths are correct, the EPC 26 can control the automatic steering system 29 to automatically guide the vehicle 10 along the re-generated swath paths to pull the implement 18 across a desired area of the field.

Figure 6:
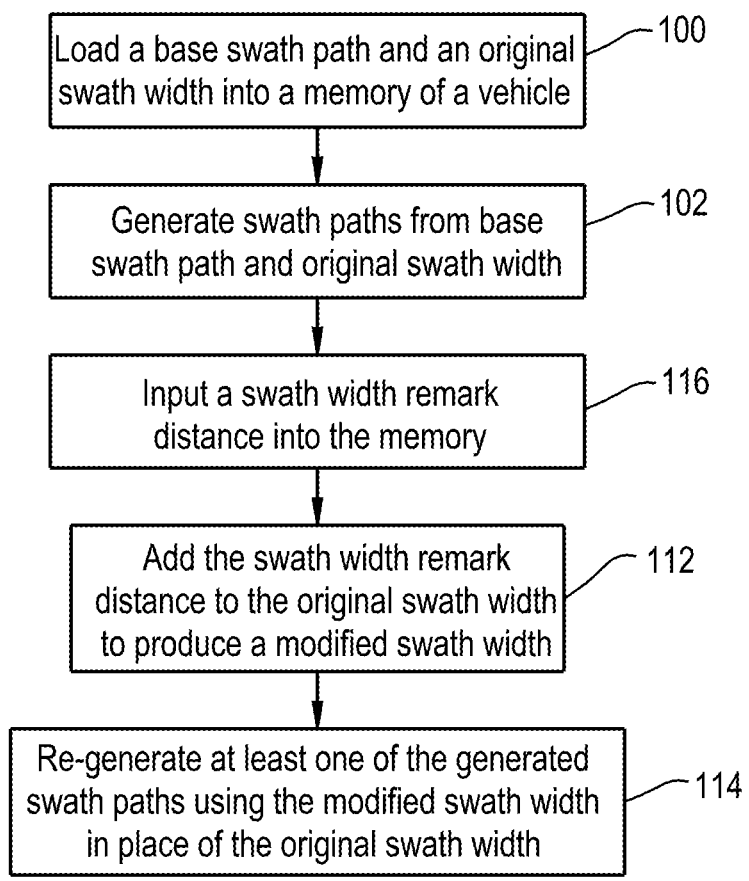
FIG. 6 is a flow chart of another embodiment of a method according to the present invention.

In some instances, the user may already know a specific swath width remark distance that is needed to correct the swath paths 19 generated from the base swath path 23. In such instances, and referring now to FIG. 6, the user may wish to input 116 a swath width remark distance into the memory 22 of the guidance system 16. The input swath width remark distance can then be added 112 to the original swath width W1 to produce a modified swath width that is used to re-generate 114 the generated swath paths 19 to produce corrected swath paths. The input swath width remark distance can also be stored in the memory 22 as a distance and/or a percentage similarly to a measured and determined swath width remark distance, and can be input as a distance over a number of swath paths or a percentage of the original swath width W1. The input swath width remark distance can also be modified by the user similarly to a measured and determined swath width remark distance. This allows the user to easily correct a mismatch error in the swath width without having to re-position the vehicle 10.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for altering a swath pattern of a vehicle, comprising the steps of:
    loading a base swath path and an original swath width into a memory of said vehicle;
    generating a plurality of swath paths from said base swath path and said original swath width, each of said generated swath paths defining at least two geographic locations;
    measuring, using a location sensor, a current geographic location of said vehicle;
    determining, using an electrical processing circuit (EPC) coupled to said memory and to said location sensor, a difference between said current geographic location and a geographic location of a generated swath path nearest to said current geographic location;
    determining, using said EPC, a number of swath paths that said generated swath path nearest to said current geographic location is subsequent to said base swath path;
    dividing, using said EPC, said difference by said determined number of swath paths to produce a swath width remark distance; and
    adding, using said EPC, said swath width remark distance to said original swath width to produce a modified swath width;
    re-generating, using said EPC, at least one of said generated swath paths with said modified swath width in place of said original swath width; and
    controlling a steering direction of said vehicle based on said at least one re-generated swath path.

2. The method according to claim 1, further comprising the step of storing said swath width remark distance.

3. The method according to claim 2, wherein said swath width remark difference is stored in said memory.

4. The method according to claim 3, wherein said swath width remark distance is stored as at least one of a distance and a percentage.

5. The method according to claim 1, wherein said vehicle includes a display coupled to said EPC.

6. The method according to claim 5, further comprising the step of displaying said swath width remark distance on said display.

7. The method according to claim 5, wherein said vehicle includes a steering mechanism operable to control movement of said vehicle and an automatic steering system linked to said steering mechanism and operable to control said steering mechanism, said EPC being operable to control said automatic steering system.

8. The method according to claim 1, further comprising the step of modifying said determined swath width remark distance to produce a modified swath width remark distance, wherein said adding step and said re-generating step are performed using said modified swath width remark distance in place of said swath width remark distance.

9. The method according to claim 8, further comprising the steps of:
    producing a new modified swath width by adding said additional swath width remark distance to said original swath width;
    replacing said modified swath width with said new modified swath width; and re-generating at least one of said generated swath paths with said new modified swath width in place of said modified swath width.

10. The method according to claim 1, wherein said measuring, said determining, and said dividing steps are repeated to determine an additional swath width remark difference.

11. An agricultural vehicle, comprising:
a chassis;
at least one farm implement carried by said chassis;
a memory carried by said chassis, said memory having a base swath path and an original swath width programmed therein;
a location sensor carried by said chassis and operable to measure a current geographic location; and
an electronic processing circuit (EPC) carried by said chassis and coupled to said memory and said location sensor, said EPC being operable to:
generate a plurality of swath paths from said base swath path and said original swath width, each of said generated swath paths defining at least two geographic locations;
determine a difference between said current geographic location and a geographic location of a generated swath path nearest to said current geographic location;
determine a number of swath paths that said generated swath path nearest to said current geographic location is subsequent to said base swath path;
divide said difference by said determined number of swath paths to produce a swath width remark distance; and
add said swath width remark distance to said original swath width to produce a modified swath width.

12. The agricultural vehicle according to claim 11, further comprising a display carried by said chassis and coupled to said EPC.

13. The agricultural vehicle according to claim 11, wherein said EPC is further operable to write said modified swath width to said memory.

14. The agricultural vehicle according to claim 11, further comprising at least one traction member carried by said chassis, a steering mechanism linked to said at least one traction member that controls a steered direction of said at least one traction member, and an automatic steering system linked to said steering mechanism and coupled to said EPC, said automatic steering system being operable to control said steering mechanism and receive steering instructions from said EPC.

15. A method for altering a swath pattern of a vehicle, comprising the steps of:
loading a base swath path and an original swath width into a memory of said vehicle;
generating a plurality of swath paths from said base swath path and said original swath width, each of said generated swath paths defining at least two geographic locations;
inputting a swath width remark distance into said memory;
adding, using an electrical processing circuit (EPC) coupled to said memory, said swath width remark distance to said original swath width to produce a modified swath width;
re-generating, using said EPC, at least one of said generated swath paths using said modified swath width in place of said original swath width; and
controlling a steering direction of said vehicle based on said at least one re-generated swath path.

16. The method according to claim 15, further comprising the step of modifying said input swath width remark distance to produce a modified swath width remark distance, wherein said adding step and said re-generating step are performed using said modified swath width remark distance in place of said swath width remark distance.

17. The method according to claim 15, further comprising the step of storing said swath width remark distance in said memory.

18. The method according to claim 17, wherein said swath width remark distance is stored as one of a distance and a percentage of said original swath width.

19. The method according to claim 15, wherein said swath width remark distance is input as one of a distance over a number of generated swath paths subsequent to said base swath path and a percentage of said original swath width.

* * * * *